(12) United States Patent
Hao et al.

(10) Patent No.: US 9,571,540 B2
(45) Date of Patent: Feb. 14, 2017

(54) BROADCAST/MULTICAST OFFLOADING AND RECOMMENDING OF INFRASTRUCTURAL CHANGES BASED ON USAGE TRACKING

(71) Applicant: Verizon Patent and Licensing Inc., Basking Ridge, NJ (US)

(72) Inventors: Jianxiu Hao, Lexington, MA (US); Jian Huang, Sudbury, MA (US); Gaurav A. Tanna, Brighton, MA (US); Ishan Awasthi, Wilmington, MA (US); Okeno R. Palmer, Woburn, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 589 days.

(21) Appl. No.: 14/031,342

(22) Filed: Sep. 19, 2013

(65) Prior Publication Data

US 2015/0081847 A1    Mar. 19, 2015

(51) Int. Cl.
*H04L 29/06* (2006.01)

(52) U.S. Cl.
CPC ....... *H04L 65/4076* (2013.01); *H04L 65/4069* (2013.01); *H04L 65/602* (2013.01)

(58) Field of Classification Search
CPC .................... H04L 65/4069; H04L 65/4076
See application file for complete search history.

(56) References Cited

U.S. PATENT DOCUMENTS

| | | | |
|---|---|---|---|
| 8,473,984 B1* | 6/2013 | Harmon | H04L 65/1083 370/310 |
| 2007/0168523 A1* | 7/2007 | Jiang | H04L 29/06027 709/228 |
| 2009/0248886 A1* | 10/2009 | Tan | H04L 12/1836 709/231 |
| 2011/0134808 A1* | 6/2011 | Thyni | H04L 12/185 370/270 |
| 2011/0191404 A1* | 8/2011 | Kako | H04L 12/185 709/202 |
| 2011/0228769 A1* | 9/2011 | Haimi-Cohen | H04L 12/18 370/390 |

* cited by examiner

*Primary Examiner* — Aaron Strange

(57) ABSTRACT

A method, a device, and a storage medium having instructions stored thereon to obtain usage data that indicates a usage of a downloading service and a streaming service of programs, in which the programs are provided to user devices via unicast delivery. The usage data is analyzed to determine whether a multicast offloading or a broadcast offloading is to be invoked on behalf of a program designated for unicast delivery. Additionally, a method, a device, and a storage medium obtain usage data, analyze the usage data, and generate a recommendation for an infrastructural change of a content delivery network based on the analysis.

25 Claims, 11 Drawing Sheets

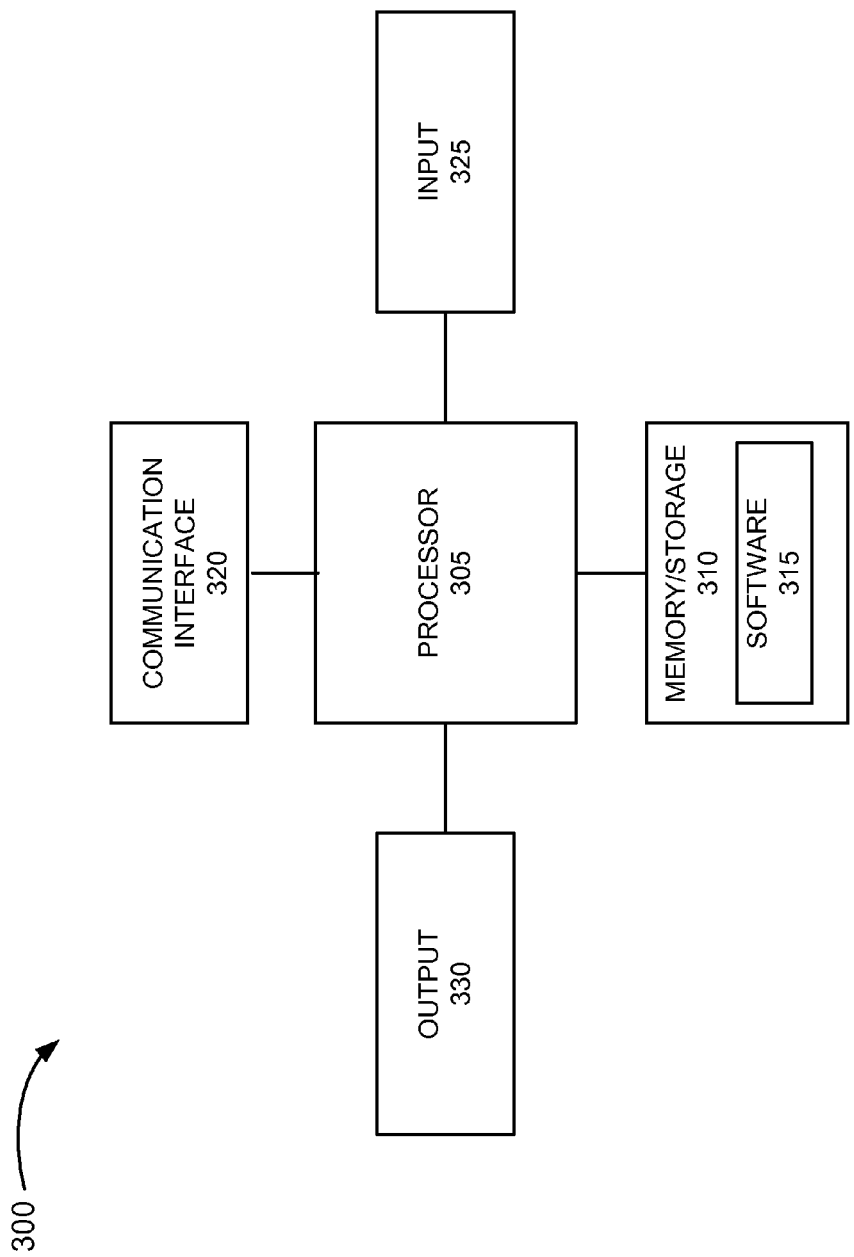

BROADCAST/MULTICAST OFFLOADING AND RECOMMENDING OF INFRASTRUCTURAL CHANGES BASED ON USAGE TRACKING

BACKGROUND

Streaming and downloading of programs is a popular delivery mechanism for providing programs to users. A content delivery network (CDN) (also known as a content distribution network) is typically used for streaming and/or downloading programs. The content delivery network includes a server that stores programs and services other servers. The other servers cache programs and stream and/or download the programs to users.

BRIEF DESCRIPTION OF THE DRAWINGS

FIG. 3 is a diagram illustrating exemplary components of a device that may correspond to one or more of the devices in an exemplary environment;

DETAILED DESCRIPTION OF PREFERRED EMBODIMENTS

Figure 1:
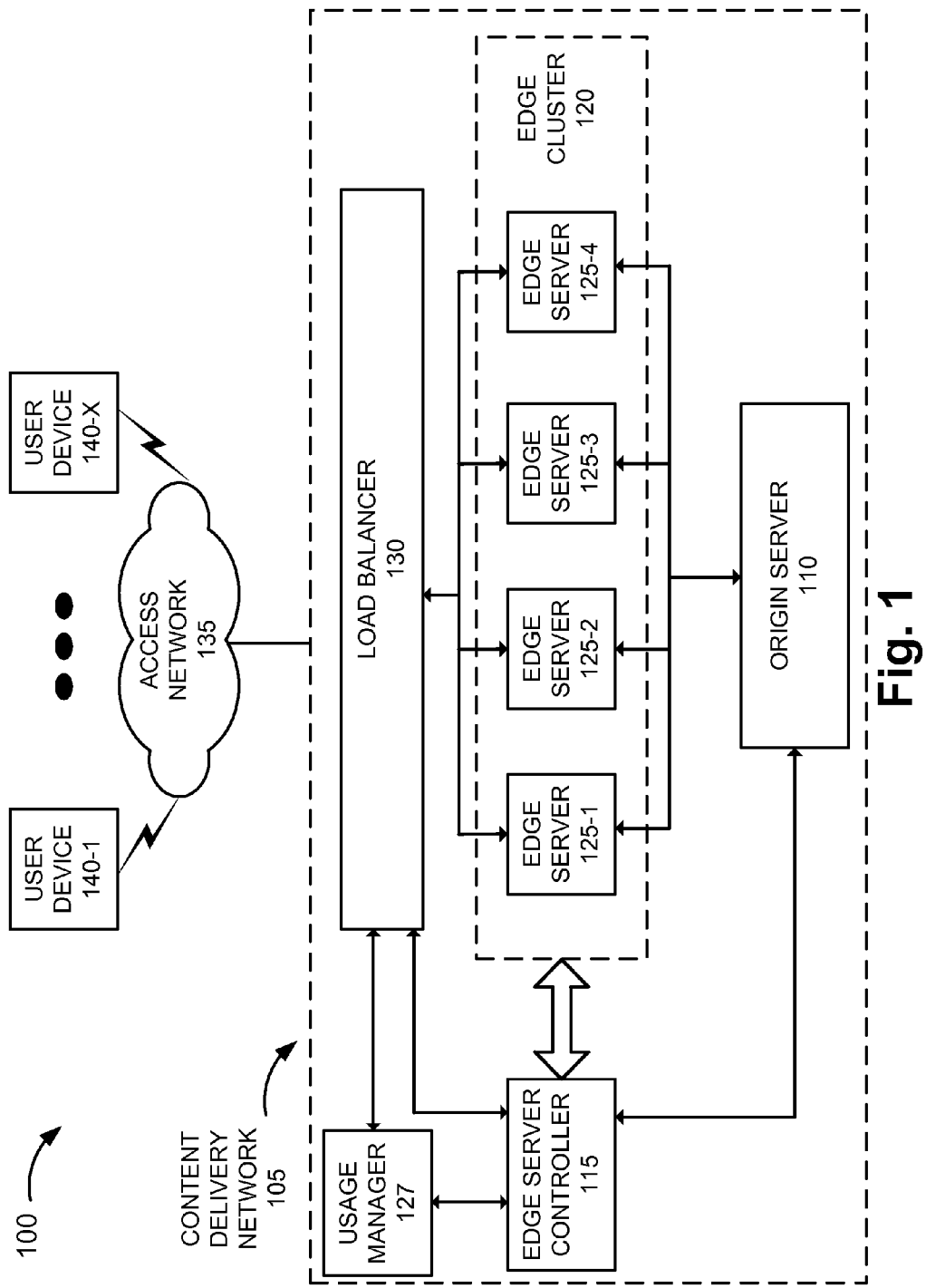
FIG. 1 is a diagram illustrating an exemplary environment of a content delivery network in which an exemplary embodiment of broadcast/multicast offloading and recommending of infrastructural changes based on usage tracking may be implemented.

The following detailed description refers to the accompanying drawings. The same reference numbers in different drawings may identify the same or similar elements. Also, the following detailed description does not limit the invention.

The caching of programs on an edge server can occur either before or after a user requests the program. A program may include audio and/or video. For example, the program may be linear content, such as live television (e.g., a local program, a national program, a sitcom, a movie, a sporting event, a news program, etc.) or on-demand content (e.g., a pay-per-view program, previously-recorded content, etc.). Alternatively, a program may include software (e.g., an application, a program, etc.) or other suitable data that may be offloaded, as described herein. Ideally, the edge server should always store any program that the user requests in order to reduce delay, etc., and provide optimal playback quality. However, in reality, as on-demand streaming and downloading requests increase and the number of programs available increase, the edge server can only host a subset of the programs due to resource constraints. The edge servers may use, for example, a Least Recently Used (LRU) algorithm or a Least Frequently Used (LFU) algorithm for selecting programs to swap.

Unfortunately, even when the edge servers store programs that are in high demand, there are limited resources allocated for servicing all of the requests from users. Typically, edge servers deliver programs to users in a unicast fashion. For example, a content delivery network may designate programs to be delivered in a unicast fashion. The user may have the option to download the program to his or her user device or stream the program to the user device.

According to an exemplary embodiment, a content delivery network dynamically manages the delivery of programs between unicast delivery and multicast and/or broadcast (also referred to as multicast/broadcast) delivery. According to an exemplary embodiment, the content delivery network determines the type of delivery (e.g., multicast, broadcast, stream, download) to use for a program based on usage data. The usage data may include various types of data pertaining to a streaming and/or a downloading service. For example, the usage data may include physical constraint data. The physical constraint data pertains to the resources (e.g., storage space, processor, buffer, bandwidth, etc.) of network devices (e.g., edge servers, etc.) and links of or used by the content delivery network that provides the streaming and/or downloading service. The usage data may include resource utilization data. The resource utilization data indicates an amount of a resource being used. The usage data may include other types of data, such as the number of user requests received or queued during any given instance of time. The number of user requests may pertain to the same program, a subset of programs available, or all of the programs available for downloading and/or streaming.

As an example, assume the content delivery network is streaming programs to users using unicast transmissions. Subsequently, assume the content delivery network receives a large number of requests for the downloading or the streaming of a program. In view of the usage data, the content delivery network (e.g., a network device) determines to shift the delivery of the program from unicast to either multicast or broadcast. For example, the requests may be queued and users may be informed that the program will be available for download or stream at a certain time (i.e., according to a schedule). The user may then, in turn, only need to ensure that their mobile device is: turned on, connected to the wireless network, and located in a geographic region providing the scheduled broadcast or multicast.

According to another exemplary embodiment, the content delivery network uses predictive offloading from unicast to broadcast or multicast. For example, the content delivery network may use popularity metrics that pertain to a program to predict an influx of program requests. By way of example, an on-demand release of a program (e.g., a movie) that was popular during its theater release may command a large number of expected user requests. In this regard, the content delivery network may determine to schedule a broadcast and/or a multicast delivery of the program. The multicast delivery of the program may be based on pre-orders (e.g., program requests already received) from users. Additionally, or alternatively, the content delivery network calculates a predictive offloading based on the arrival of program requests. For example, assume the number of program requests is continuously rising within a certain time period. Although the current resource utilization is not taxed, the content delivery network may invoke a predictive broadcast or a predictive multicast offloading based on the predicted arrivals of program requests. The content delivery network may use well-known methods to predict the arrivals of program requests. Broadcast and/or multicast offloading, whether predictive or not, may be targeted to a specific geographic area or may be network wide.

According to an exemplary embodiment, the content delivery network measures the usage of the content delivery network. Based on the usage, the content delivery network evaluates the distribution of content delivery devices. For example, the content delivery network identifies whether the allocation of resources is optimally utilized based on the measured usage. By way of further example, assume a content delivery network device services a particular geographic area that has a low usage (e.g., low demand for downloading and/or streaming). The content delivery network generates a recommendation to remove the content delivery network device from the geographic area or reduce the available network resources associated with this service point (e.g., reduce the number of edge cache servers, etc.).

FIG. 1 is a diagram illustrating an exemplary environment in which an exemplary embodiment of broadcast/multicast offloading and recommending of infrastructural changes based on usage tracking may be implemented. As illustrated, environment 100 includes a content delivery network 105 that includes an origin server 110, an edge server controller 115, an edge cluster 120 including edge servers 125-1 through 125-4 (referred to collectively as edge servers 125). Additionally, each of edge servers 125 (or in the generic sense) may be referred to as edge server 125. Environment 100 also includes a usage manager 127, a load balancer 130, an access network 135, and user devices 140-1 through 140-X (referred to collectively as user devices 140). Additionally, each of user devices 140 (or in the generic sense) may be referred to as user device 140.

Environment 100 may be implemented to include wired (e.g., cable, optical, etc.) and/or wireless connections (e.g., radio, etc.) among the devices and networks illustrated. A connection may be direct or indirect and may involve intermediary device(s) and/or network(s) not illustrated in FIG. 1. Additionally, the number and the arrangement of connections in environment 100 are exemplary.

The number of devices and the configuration in environment 100 are exemplary and provided for simplicity. According to other embodiments, environment 100 may include additional devices, fewer devices, different devices, and/or differently arranged devices, than those illustrated in FIG. 1. For example, according to other embodiments, environment 100 may not include edge server controller 115.

According to other embodiments, a single device in FIG. 1 may be implemented as multiple devices and/or multiple devices may be implemented as a single device. For example, origin server 110 and edge server controller 115 may be implemented as a single device. By way of another example, edge server controller 115 and usage manager 127 may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, a proxy device, a cloud device, or a combination thereof).

According to other embodiments, environment 100 may include additional networks and/or different networks than those illustrated and/or described in reference to FIG. 1. For example, environment 100 may include other types of network(s), such as the Internet, etc.

Also, according to other embodiments, one or more functions and/or processes described as being performed by a particular device may be performed by a different device, or some combination of devices. Environment 100 may be implemented to include wired and/or wireless connections among the devices illustrated.

Content delivery network 105 includes a network that provides a downloading service of programs and/or a streaming service of programs. By way of example, content delivery network 105 may be implemented as a packet network (e.g., an Internet Protocol (IP) network), a wide area network (WAN), a private network, and/or other suitable type of network. Content delivery network 105 may support single bit rate streaming/downloading and/or multibit rate streaming/downloading. Content delivery network 105 may be implemented to support smooth streaming, dynamic streaming, and/or adaptive bitrate streaming. Content delivery network 105 may support various protocols, such as, the Real Time Streaming Protocol (RTSP), the Real Time Messaging Protocol (RTMP), the Hypertext Transfer Protocol (HTTP) Live Streaming (HLS), the Microsoft Media Services (MMS) protocol, etc.

Origin server 110 includes a network device that stores programs to be downloaded and/or streamed to users. By way of example, origin server 110 may be implemented as a computational device (e.g., a computer, etc.), a server (e.g., a Web server, an application server, etc.), and/or other suitable network device (e.g., a repository system). Origin server 110 provides programs to edge servers 125 for caching. According to an exemplary implementation, origin server 110 provides programs to edge servers 125 based on communications (e.g., requests) from edge server controller 115. According to another implementation, origin server 110 provides programs to edge servers 125 based on communications (e.g., requests) from edge servers 125.

Edge server controller 115 includes a network device that manages edge cluster 120 (e.g., edge servers 125). By way of example, edge server controller 115 may be implemented as a computational device (e.g., a computer, etc.), a server (e.g., a Web server, an application server, etc.), and/or other suitable network device. Edge server controller 115 manages the caching of programs on behalf of edge servers 125 based on well-known methods and/or proprietary methods. For example, edge server controller 115 may use various algorithms (e.g., LRU, LFU, etc.), may obtain various types of information (e.g., statistical information, etc.), etc., pertaining to edge servers 125 so as to manage the caching of programs by edge servers 125. According to other embodiments, the managing of programs cached by edge servers 125 is performed without edge server controller 115. For example, each edge server 125 manages its own caching of programs using some form of collaborative caching. Edge server 125 includes a network device that caches programs and services streaming and/or downloading requests.

Usage manager 127 includes a network device that manages the broadcast/multicast offloading based on the usage data, as described herein. Additionally, usage manager 127 generates a recommendation pertaining to the allocation of resources in content delivery network 105 based on usage data, as described herein. By way of example, usage manager 127 may be implemented as a computational device (e.g., a computer, etc.), a server (e.g., a Web server, an application server, etc.), and/or other suitable network device.

Load balancer 130 includes a network device that distributes workload across edge servers 125 of edge cluster 120. By way of example, load balancer 130 may be implemented as a computational device (e.g., a computer, etc.), a server (e.g., a Web server, an application server, etc.), and/or other suitable network device. According to an exemplary implementation, load balancer 130 distributes the load pertaining to user requests of programs in an equally distributed fashion. According to another exemplary implementation, load balancer 130 distributes the load based on other well-known criterion or approach (e.g., round robin, weighted round robin, least connections, least response time, edge server load, etc.).

Access network 135 includes a wireless network that provides access, directly or indirectly, to content delivery network 105. For example, access network 135 may be implemented as a mobile network, a public network, a private network, a wide area network, a metropolitan area network, and/or a data network. By way of further example, access network 135 may be implemented to include a Long Term Evolution (LTE) network.

User device 140 includes a mobile device or other type of end user device capable of downloading and/or streaming a program. For example, user device 140 may be implemented as a smartphone, a tablet device, a handheld device, a personal digital assistant (PDA), a palmtop device, a laptop computer, a netbook, a tablet, a gaming device, a desktop computer, or a vehicular communication system (e.g., in a car, etc.). User device 140 is capable of downloading or streaming a program. For example, user device 140 includes client software that allows a user to communicate download and/or streaming requests to servers in content delivery network 105 and to play and/or store the programs.

Figure 2A:
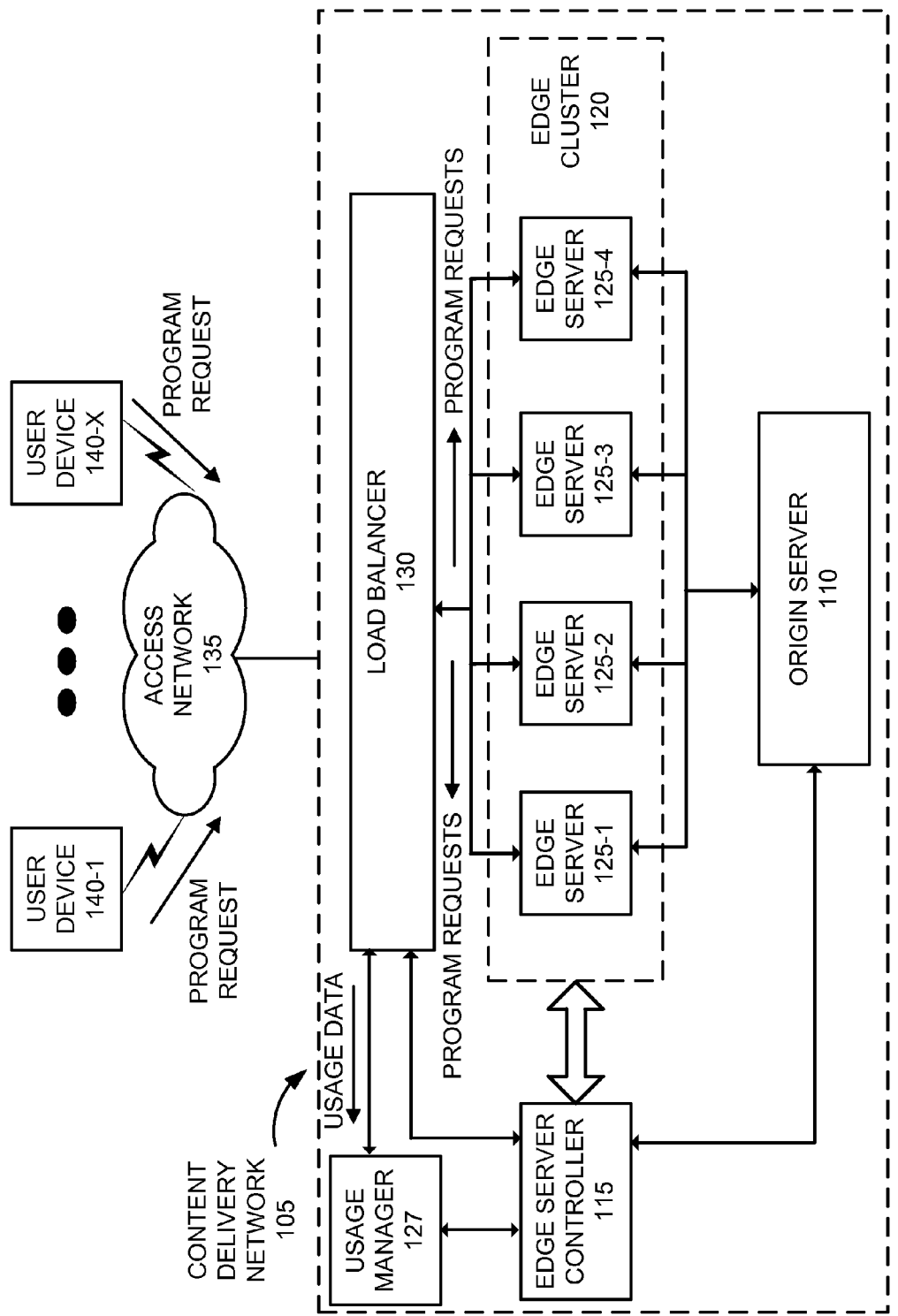
FIGS. 2A-2D are diagrams that illustrate an exemplary process pertaining to a multicast/broadcast offloading that is based on usage data.

FIGS. 2A-2D illustrate an exemplary process pertaining to multicast/broadcast offloading in environment 100. Referring to FIG. 2A, assume that user devices 140 transmit program requests to a streaming service provided by content delivery network 105. The program requests are received by load balancer 130, load balanced, and forwarded to edge servers 125.

Figure 2B:
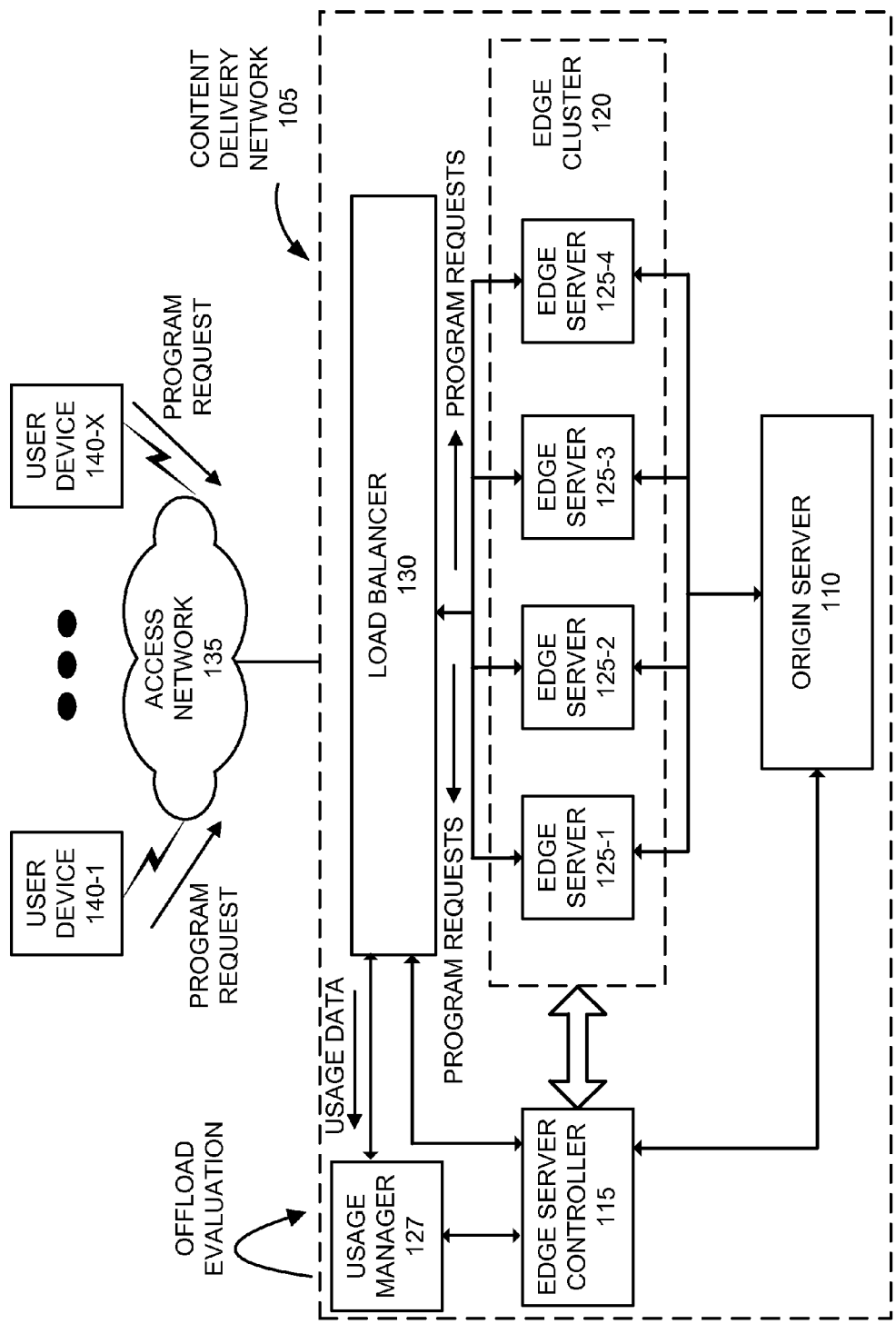

Referring to FIG. 2B, usage manager 127 obtains usage data from load balancer 130 via a push method or a pull method (e.g., periodically, reactively, proactively, etc.). The usage data may include request data. The request data may include the received program requests or processed data stemming from the program requests (e.g., data indicating the number of program requests received over a period of time, etc., as described further below). The number of program requests may pertain to program requests stored in a buffer of load balancer 130 (e.g., in which program delivery has not yet begun) and/or program requests in which program delivery has begun (e.g., the program requests have been sent to and/or serviced by edge servers 125).

The usage data may include session data. For example, the session data indicates session state data pertaining to connections between edge servers 125 and user devices 140. According to an exemplary implementation, load balancer 130 obtains session data from edge servers 125. Additionally, or alternatively, load balancer 130 maintains a socket pool. The socket pool may indicate the states of socket connections (e.g., active, inactive, etc.) of edge servers 125. Alternatively, edge server controller 115 or edge servers 125 may provide session data to usage manager 127. For example, although not illustrated, there may be links between usage manager 127 and edge servers 125 that can be used to provide session data from edge servers 125 to usage manager 127.

Usage manager 127 may also obtain other types of usage data. For example, the usage data may include network resource utilization data from load balancer 130, edge servers 125, or another network device (e.g., a network performance or monitoring device) (not illustrated). For example, the network resource utilization data may indicate available bandwidth, congestion indication data (e.g., notification of congestion, data indicating invocation of congestion avoidance, etc.), failure data (e.g., a device failure, a link failure, a power failure, etc.), or other types of network state data (e.g., data pertaining to network performance metrics, such as latency, etc.). The network resource utilization data may pertain to network devices and links (e.g., access network 135) not included in content delivery network 105 but are a part of the content delivery path to user devices 140. Additionally, or alternatively, the network resource utilization data may pertain to network devices and links of content delivery network 105. According to another exemplary implementation, edge servers 125 may include a resource monitoring agent that calculates a resource utilization value pertaining to resources (e.g., processor, storage, communication interface, etc.). Usage manager 127 obtains the resource utilization values from edge servers 125 as usage data. Usage manager 127 may obtain resource utilization values from other network devices of content delivery network 105 (e.g., load balancer 130, edge server controller 115, etc.). Usage data may also include device type data that indicates whether user device 140 is a smart phone, a tablet, a game system (e.g., an Xbox, a Playstation, etc.), a smart television, etc. Usage data may also include user usage information, such as the length of a program viewed by users.

In response to obtaining the usage data, usage manager 127 analyzes the usage data to determine whether broadcast/multicast offloading is to be invoked. Usage manager 127 may perform the analysis of the usage data on a per-device level (e.g., edge server 125-1, load balancer 130, etc.), a sub-group level (e.g., edge servers 125-1 and 125-2, edge server 125-1 and load balancer 130, etc.), or a group level (e.g., all of edge servers 125, etc.). Depending on the data included in the usage data, usage manager 127 may perform different types of analysis. For example, as previously described, the usage data may include the program request, processed program request data, session data, and/or resource utilization data.

According to an exemplary embodiment, usage manager 127 may identify or generate a current usage value or a current usage sub-value based on an analysis of the usage data. Usage manager 127 may combine the current usage sub-value (e.g., by way of a mathematical operation, such as addition, subtraction, etc.) with one or multiple other current usage sub-values to generate the current usage value. For example, when the usage data includes program request data and resource utilization data, usage manager 127 may analyze the usage data and generate a current usage sub-value pertaining to the program request data and another current usage sub-value pertaining to the resource utilization data. According to another exemplary embodiment, usage manager 127 may analyze and generate a current usage value, without the generation of sub-values, even when the usage data includes different types of data.

Given the distinctive nature between downloading and streaming of a program, as well as the distinctive nature between multicasting and broadcasting, usage manager 127 may generate multiple current usage values directed to the specific type of offloading. For example, usage manager 127 may generate a current usage value pertaining to the multicasting of a program via a downloading service and another current usage value pertaining to the broadcasting of a program via a streaming service. Alternatively, a more simplified approach may be implemented in which the current usage value is non-specific pertaining to whether the program is downloaded or streamed, delivered via a multicast transmission or a broadcast transmission, or some combination thereof. Usage manager 127 may make determinations relating to whether the offloading includes a multicast, a broadcast, or both, as well as whether the program is provided via a streaming service, a downloading service, or both, based on other factors, as described below. For example, the decision to broadcast may be based on the availability of a broadcast channel and/or other network resources needed to support the broadcast of the program. Additionally, for example, the decision to stream or to download a program may be based on similar considerations.

According to an exemplary embodiment, usage manager 127 compares the current usage value to a threshold utilization value to determine whether to invoke the broadcast/multicast offloading. Additionally, in a similar manner, the threshold utilization value may be specific or non-specific in relation to multicasting, broadcasting, downloading, and streaming. Based on a result of the comparison, usage manager 127 invokes the broadcast/multicast offloading or does not invoke the broadcast/multicast offloading. Provided below are exemplary processes pertaining to the analysis of the usage data.

According to an exemplary embodiment, usage manager 127 analyzes the program request data. For example, when the program request data includes the program requests, usage manager 127 may count the number of program requests and store a number of program requests value. Additionally, usage manager 127 may inspect the program requests to identify the programs requested (e.g., identify program identifiers). Usage manager 127 may correlate a number of program requests to a particular program. Usage manager 127 may also identify an edge server 125 that is responsible for servicing the program request. For example, usage manager 127 may identify a service area in which the program request originated based on a network address included in the program request or geographic data (e.g., based on the communication interface, port, etc.) provided by load balancer 130 and relating to the program request received. Additionally, for example, usage manager 127 may inspect the program requests to identify whether the request pertains to the downloading of the program or a streaming of the program.

Alternatively, when the program request data includes processed program request data, usage manager 127 may forego certain calculations, such as counting the number of program requests, correlating the program requests to a particular program, identifying a service area, and/or identifying program requests for downloading versus streaming. Usage manager 127 may also perform other forms of analysis, such as, rate of change of program request arrivals, rate of change of program request arrivals pertaining to a particular program, a service area, and/or other factors. Usage manager 127 may use date and timestamp data included in the program requests or provided in the processed program request data, such as time window data (e.g., indicating a 15 minute time window, a 30 minute time window, etc.) to calculate a rate of change.

Based on this data, usage manager 127 generates a current usage value or sub-value, which may be used for comparison to a threshold utilization value. For example, the threshold utilization value may represent a minimum number of program requests pertaining to a program; a minimum number of program requests pertaining to a program and within a particular geographic service region; a minimum number of program requests pertaining to a program, for streaming, and within a particular geographic service region; or a minimum number of program requests pertaining to a program, for downloading, and within a particular geographic service region, which when satisfied, serves as a trigger to perform broadcast/multicast offloading. Alternatively, the threshold utilization value represents a minimum usage that takes into account the minimum number of program requests, etc.

According to an exemplary embodiment, usage manager 127 analyzes the session data. For example, usage manager 127 calculates the number of active sessions. Usage manager 127 may correlate each active session to a program. Usage manager 127 may also identify an edge server 125 that is servicing the active session. Usage manager 127 may calculate a current usage value or a sub-value based on this data.

According to another exemplary embodiment, usage manager 127 may also calculate the number of sessions within a future time window (e.g., within the next hour, etc.). For example, usage manager 127 may obtain a duration of each active session and the length of the program (e.g., when streaming) or an estimated download time for the program (e.g., when downloading). In this way, usage manager 127 may calculate the number of sessions within the future time window. For example, some active sessions may be near termination because the program is about to end (e.g., in a streaming situation) or the downloading of a program may be nearly completed. In this regard, the number of active session may change over time. User manager 127 may also account for future program request arrivals based on well-known methods (e.g., historical program request arrival data, an autoregressive model, a dynamic regression model, a program popularity metric, etc.). Based on this data, usage manager 127 generates a current usage value or a sub-value, which may be used for comparison to a threshold utilization value. For the example, the threshold utilization value may represent a minimum number of sessions pertaining to a program or a minimum number of sessions pertaining to a program and within a particular geographic service region, which when satisfied, serves as a trigger to perform broadcast/multicast offloading. Alternatively, the threshold utilization value represents a minimum usage that takes into account the minimum number of sessions, etc.

According to an exemplary embodiment, usage manager 127 analyzes the resource utilization data. According to an exemplary implementation, usage manager 127 analyzes the resource utilization data based on resource data. For example, usage manager 127 stores resource data pertaining to edge servers 125. The resource data indicates various resource parameters pertaining to resources (e.g., processor, storage, buffer, communication interface, etc.) associated with each edge server 125. For example, a resource parameter pertaining to the processor may indicate the number of instructions/per second that can be executed, a resource parameter pertaining to the communication interface may indicate a maximum number of connections that the communication interface can handle, a resource parameter pertaining to the buffer may indicate a maximum number of program requests that can be stored or queued, etc. Usage manager 127 may also store resource data pertaining to other network devices (e.g., load balancer 130, edge server controller 115, origin server 110, etc.), links of content delivery network 105, network devices and links of access network 135, etc.

Based on this data, usage manager 127 uses the resource utilization data and the resource data to generate a current usage value or a sub-value, which may be used for comparison to a threshold utilization value. For example, the threshold utilization value may represent a minimum resource utilization, which when satisfied, serves as a trigger to perform broadcast/multicast offloading. Alternatively, the threshold utilization value represents a minimum usage that takes into account the minimum resource utilization.

As previously described, content delivery network 105 includes a predictive broadcast/multicast offloading. According to an exemplary embodiment, usage manager 127 stores multiple threshold utilization values. For example, a threshold utilization value may pertain to situations in which predictive offloading is not invoked and another threshold utilization value may pertain to situations in which predictive offloading is invoked. According to an exemplary implementation, the selection of the threshold utilization value may depend on an arrival rate (e.g., a rate of arrivals, a rate of change of arrivals, etc.) of program requests and/or a current usage value. For example, usage manager 127 may select a predictive, threshold utilization value when the rate of program request arrivals meets a certain threshold arrival rate that is indicative of a high influx of program requests within a short time period. Alternatively, usage manager 127 selects a non-predictive, threshold utilization value when the rate of program request arrivals is below a certain threshold arrival rate.

Usage manager 127 may consider user device types (e.g., mobile device, game system, etc.), device capabilities (e.g., available storage size), program delivery types (e.g., HTTP Live Streaming or Smooth Streaming), program format (e.g., high definition, standard definition, etc.). User manager 127 may determine that a program (e.g., a television show just released) is to be pushed to some user devices 140 during off-peak hours (e.g., at night) since these types of user devices 140 have a large storage. In this way, the users may download the program and save the program for later viewing (e.g., the next day). By way of example, the program may be pushed to wireless devices during off-peak hours using multicast channels for downloading and subsequent viewing the next day.

Based on the result of the comparison between the current usage value and the threshold utilization value, usage manager 127 determines whether to invoke broadcast/multicast offloading. For example, if the threshold utilization value is not satisfied, then usage manager 127 would determine that broadcast/multicast offloading is not to be invoked. According to these circumstances, content delivery network 105 may service program requests using unicast transmissions. However, if the threshold utilization value is satisfied, then usage manager 127 would determine that broadcast/multicast offloading is to be invoked. According to these circumstances, content delivery network 105 would service program requests using multicast and/or broadcast transmissions.

Depending on the specifics of a scenario, usage manager 127 may select one or multiple programs for multicast and/or broadcast offloading. For example, assume that a particular program is responsible for a certain percentage of program requests being serviced and, in turn using a certain amount of resources. Usage manager 127 identifies the particular program based on the usage data and invokes multicast and/or broadcast offloading for that program. According to another scenario, assume that multiple programs either collectively or individually are responsible for a certain percentage of program requests being serviced and, in turn using a certain amount of resources. Usage manager 127 identifies those particular programs based on the usage data and invokes multicast and/or broadcast offloading for those programs.

According to an exemplary embodiment, usage manager 127 selects whether the program is to be downloaded or streamed via a multicast transmission, a broadcast transmission, or a combination thereof. For example, usage manager 127 may consider various factors. For example, usage manager 127 may identify the availability of a broadcast channel and the availability of a multicast channel. Usage manager 127 may also consider a level of demand for the program relative to a geographic area. For example, usage manager 127 may select a multicast transmission when the demand level is below a particular demand level and a broadcast transmission when the demand level is above a particular demand level. For example, the demand level may be calculated based on the number of program requests received for the program during a certain time window; the number of program requests for the program received during a certain time window and within a certain geographic area (e.g., a cell area of a mobile network); or the number of program requests for the program received during a certain time window in combination with a predicted number of program requests within a future time window, etc. Usage manager 127 may also consider network resources other than the availability of a broadcast channel or the availability of the multicast channel. For example, the downloading of a program may use network resources over a much smaller time period relative to the streaming of the program. Similarly, the multicasting of a program may use network resources to a smaller degree compared to the broadcasting of the program. Usage manager 127 may apply network policies to assist in determining the type of offloading and the delivery service to be used.

According to an exemplary embodiment, a decision to invoke a multicast and/or a broadcast applies to program requests not yet serviced by edge servers 125. For example, program requests received by load balancer 130 but not yet distributed to edge servers 125 may be tagged for broadcast or multicast streaming delivery.

Figure 2C:
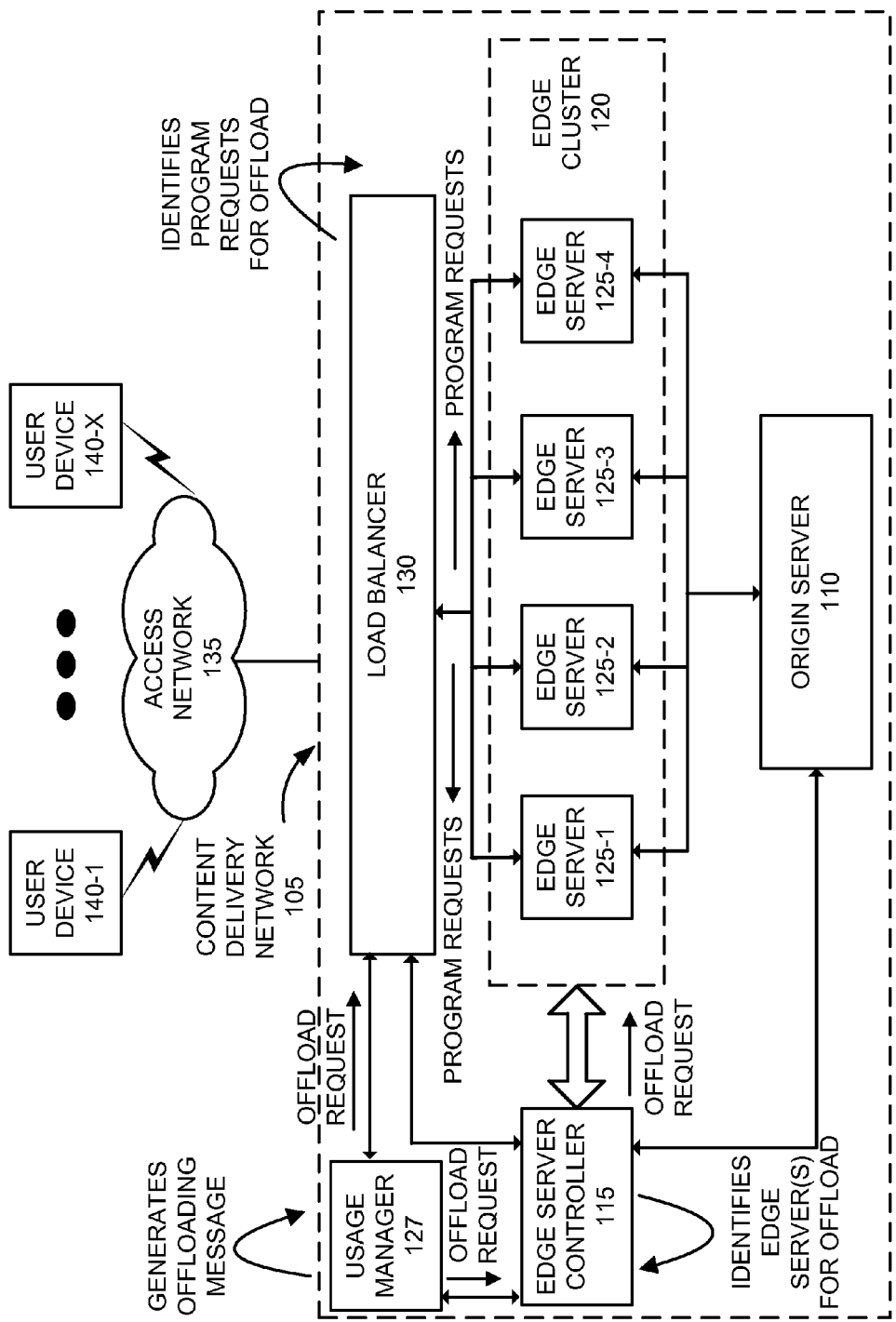

Referring to FIG. 2C, according to an exemplary embodiment, usage manager 127 communicates the decision to invoke the multicast and/or the broadcast to load balancer 130 and/or edge server controller 115. For example, user manager 127 generates an offload request. The offload request includes, for example, a program identifier that indicates the program to be offloaded and a flag indicating whether the offload is a multicast-type or a broadcast-type. The offload request may also indicate other data, such as a geographic region to which the offloading is applicable, an offloading address (e.g., a multicasting address, a broadcasting address), a schedule pertaining to the offloading (e.g., date and time when the multicast and/or the broadcast is/are to occur), whether the offloading uses the downloading service, the broadcasting service, or both, and a date and timestamp indicating when the decision to invoke the offloading occurred.

According to other embodiments, edge server controller 115 and/or load balancer 130 may generate and transmit messages to edge servers 125, in response to receiving the offload request, to indicate any of the data included in the offload request, as previously described. For example, edge server controller 115 or load balancer 130 may select an offloading address, may calculate a schedule for the offloading, etc.

As further illustrated in FIG. 2C, according to an embodiment, edge servers 125 are informed of the offloading based on the offload request. For example, according to an exemplary implementation, in response to receiving the offload request, load balancer 130 inspects program requests received and identifies program requests to be offloaded. For example, load balancer 130 identifies the program identifier of the program requested. Load balancer 130 may insert data (e.g., via a flag, a bit, etc.) or set data in the identified program requests so that the program requests can be interpreted to be designated for offload. In this way, load balancer 130 may relieve some of the load on edge servers 125 from identifying program requests targeted for offloading. Load balancer 130 transmits the program requests, which include indications for offloading, to the appropriate edge servers 125.

According to another exemplary implementation, in response to receiving the offload request, edge server controller 115 identifies which of edge servers 125 are targeted for offloading based on the geographic region to which the offloading is applicable. For example, as previously described, the offload request may indicate the geographic region to which the offloading is applicable and edge server controller 115 may store information relating to geographic regions serviced by each edge server 125. Edge server controller 115 transmits the offload request to the appropriate edge servers 125.

Figure 2D:
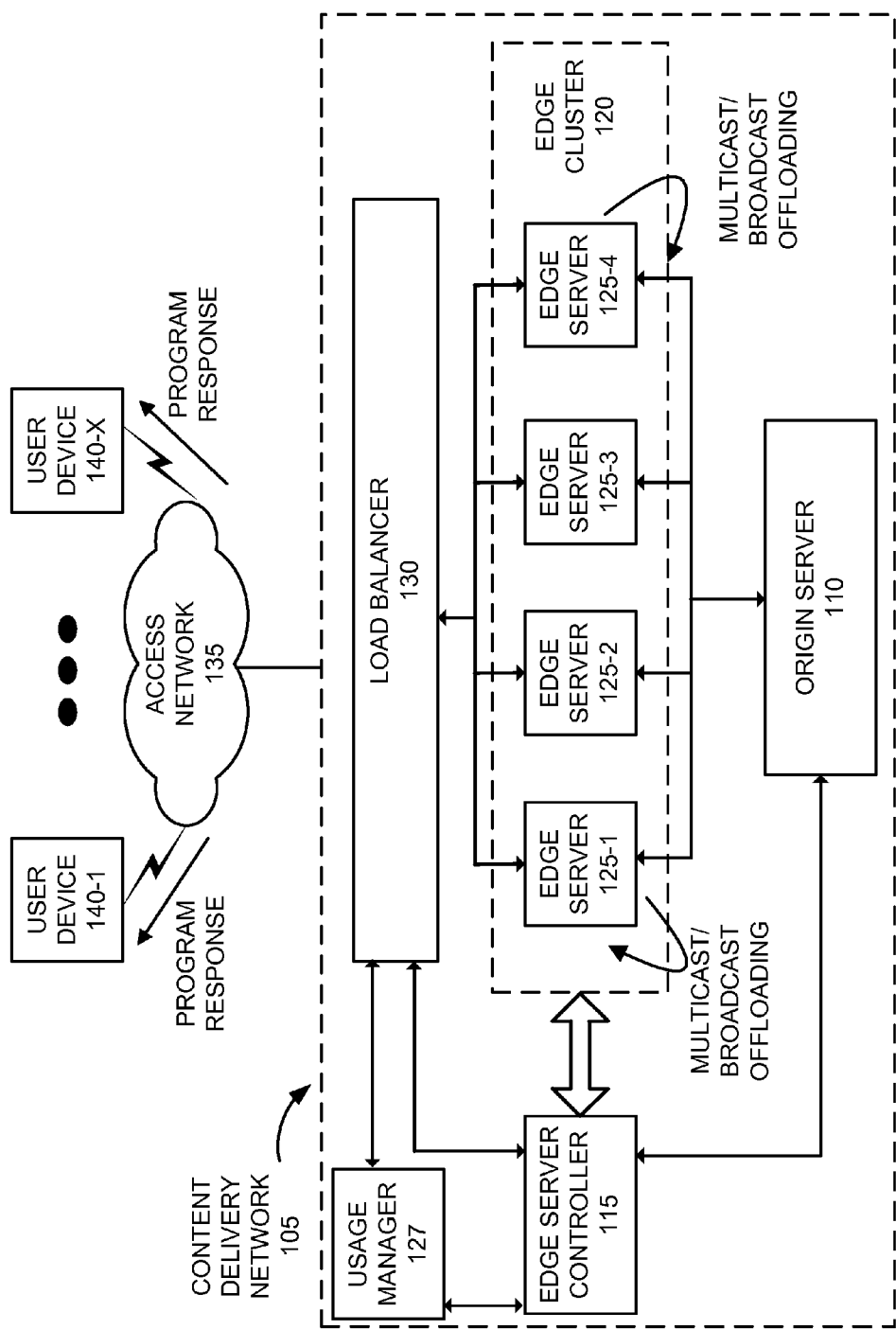

Referring to FIG. 2D and according to this example, edge servers 125-1 and 125-4 perform multicast/broadcast offloading. The offloading may take place according to a schedule and offload channel/network address which is provided to user devices 140. For example, edge servers 125 may transmit a program response that includes the schedule of the broadcast/multicast and connectivity information (e.g., IP address, channel, etc.). Content delivery network 105 may operate in an offloading mode until completion of the multicast/broadcast. For example, content delivery network 105 may service any identified program requests received via the multicast transmission/broadcast transmission.

From the user's perspective, there may be delay between the initial transmission of the program request to content delivery network 105 and the actual transmission of the program. For example, a user may request a program, via user device 140, at 3:30 p.m., but the broadcast or the multicast may be scheduled at 5:00 p.m. Upon determining to invoke the broadcast or the multicast offloading, content delivery network 105 transmits a program response and the user may accept or refuse this offer. For example, content delivery network 105 may transmit the program response at 3:35 p.m. In response to receiving the program response, user device 140 may display a notification that indicates a scheduled broadcast or multicast. For example, the program response may include data indicating the name of the program, a picture pertaining to the program, a schedule (e.g., date and time, geographic region (e.g., city, state, etc.), and a type of transmission (e.g., multicast, broadcast, etc.). The notification may also inform the user the reason for the broadcast or multicast (e.g., due to high demand, network congestion, etc.). The user may indicate his or her acceptance to receive the broadcast or the multicast via a user interface. The user's response may be communicated to edge server 125. Content delivery network 105 may manage the multicast/broadcast offloading based on this information. Thereafter, user device 140 automatically performs the necessary operations to receive the multicast or broadcast. User device 140 may also provide various reminders or notifications. For example, user device 140 may include an offloading agent (not illustrated) that generates and provides a reminder to the user minutes before the scheduled broadcast/multicast. Additionally, for example, user device 140 may indicate to the user if the user leaves a geographic region designated for the broadcast/multicast.

FIG. 3 is a diagram illustrating exemplary components of a device 300 that may correspond to one or more of the devices in the environments described herein. For example, device 300 may correspond to usage manager 127, edge server 125, user device 140, as well as other network devices. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or computer programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to usage manager 127, software 315 may include an application that, when executed by processor 315, provides the functions of usage manager 127, as described herein. Additionally, for example, with reference to load balancer 130, edge server controller 115, and edge servers 125, software 315 may include an application that, when executed by processor 315, provides the functions of these devices, as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 or from another device via communication interface 320. The instructions stored by memory/storage 310 may cause processor 305 to perform a process described herein. Alternatively, for example, according to other implementations, device 300 may perform a process described herein based on the execution of hardware (processor 305, etc.).

Figure 4:
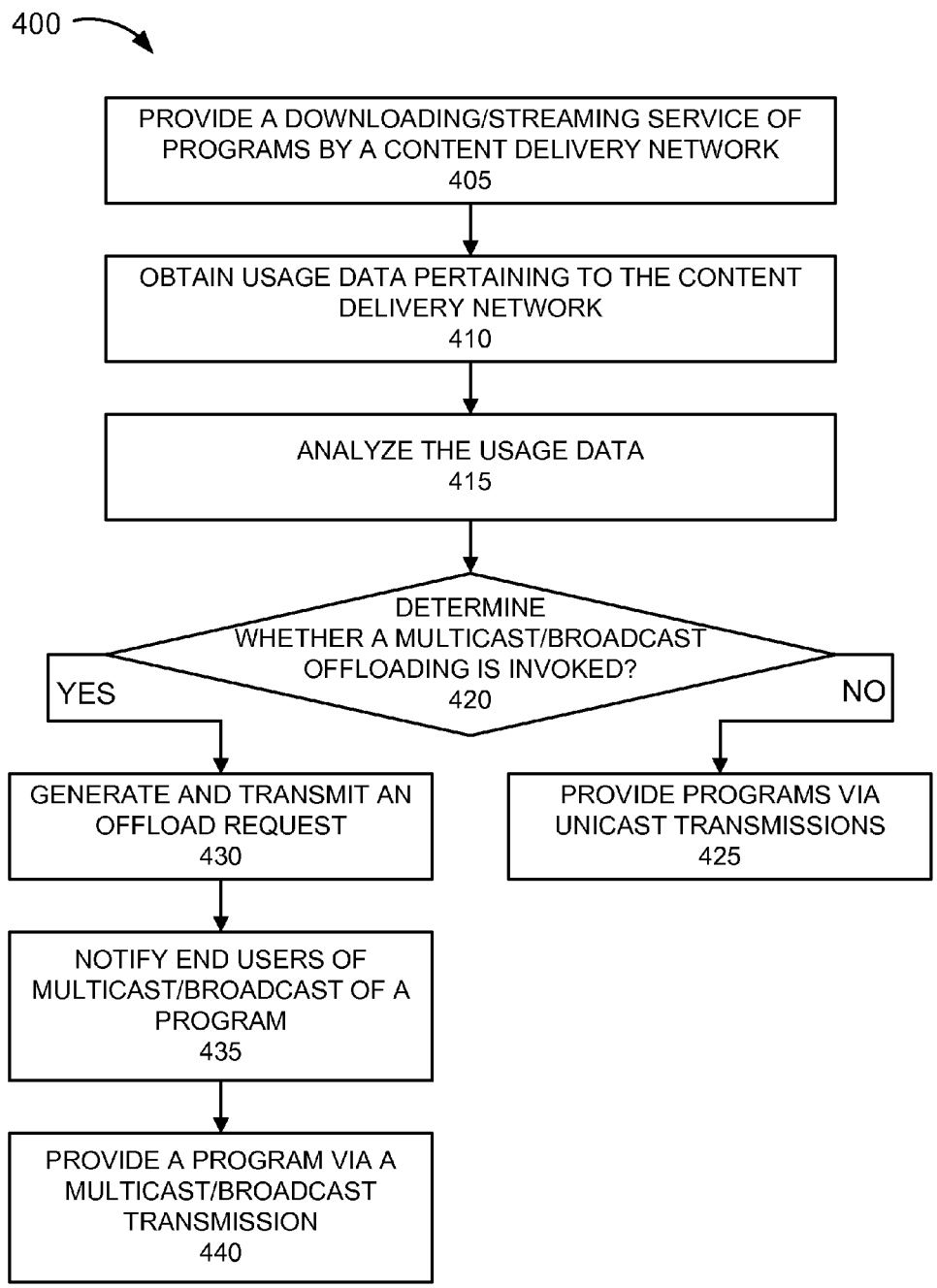
FIG. 4 is a flow diagram that illustrates an exemplary broadcast/multicast offloading process.

FIG. 4 is a flow diagram illustrating an exemplary broadcast/multicast offloading process 400. Process 400 is directed to a process previously described above with respect to FIGS. 2A-2D and elsewhere in this description, in which usage manager 127 invokes broadcast/multicast offloading of a program based on usage data. According to an exemplary embodiment, usage manager 127 performs one or more of the steps described in process 400. For example, processor 305 may execute software 315 to perform the steps described.

Process 400 begins by providing a downloading/streaming service of programs by a content delivery network (block 405). For example, content delivery network 105 offers programs to users via a downloading and/or streaming (downloading/streaming) service. For example, edge servers 125 allow for the downloading and/or streaming of programs to user devices 140 associated with users. Edge servers 125 receive program requests and provide the requested programs to user devices 140 using unicast transmissions. Content delivery network 105 may designate the type of delivery for the programs (i.e., unicast transmission).

In block 410, usage data pertaining to the content delivery network is obtained. For example, usage manager 127 obtains usage data from a network device of content delivery network 105 (e.g., load balancer 130, edge servers 125, edge server controller 115). Additionally, for example, usage manager 127 may obtain usage data from another network device (e.g., a network performance or monitoring device). As described herein, the usage data may include data pertaining to program requests received from users, session data, and resource utilization data.

In block 415, the usage data is analyzed. For example, usage manager 127 analyzes the usage data and calculates a current usage value, as previously described. The current usage value represents a usage state of content delivery network 105 or of the downloading and/or streaming service (which may include network devices and links not included in content delivery network 105). Usage manager 127 compares the current usage value to a threshold utilization value.

In block 420, it is determined whether a multicast/broadcast offloading is to be invoked. For example, based on the comparison of the current usage value and the threshold utilization value, usage manager 127 determines whether to invoke the multicast/broadcast offloading.

In block 425, if it is determined that the multicast/broadcast offloading is not to be invoked (block 420—NO), then programs are provided via unicast transmissions (block 425). For example, if the current usage value does not satisfy the threshold utilization value, usage manager 127 determines that multicast/broadcast offloading is not invoked. According to this circumstance, content delivery network 105 may continue to service program requests via unicast transmissions.

In block 430, if it is determined that the multicast/broadcast offloading is to be invoked (block 420—YES), then an offload request is generated and transmitted (block 430). For example, if the current usage value satisfies the threshold utilization value, usage manager 127 generates and transmits an offload request. As previously described, the offload request indicates the program to be offloaded, whether the offload is a multicast-type, a broadcast-type, or both, a geographic region to which the offloading pertains, a schedule, and whether the offloading uses the downloading service, the streaming service, or both.

In block 435, end users are notified of the multicast/broadcast of a program. For example, content delivery network 105 transmits a program response to user devices 140. The program response indicates the scheduled offloading (e.g., a multicast of the program, a broadcast of the program, whether the program is provided using a download service, a streaming service, etc.). End users of the program service may reply to the program response. Content delivery network 105 receives the program response and manages the offloading based on the program replies.

In block 440, the program is provided via a multicast/broadcast transmission. For example, content delivery network 105 performs the offloading and provides the programs according to the schedule and process 400 ends.

Although FIG. 4 illustrates an exemplary broadcast/multicast offloading process 400, according to other embodiments, process 400 may include additional operations, fewer operations, and/or different operations than those illustrated in FIG. 4 and described herein.

As previously described, according to an exemplary embodiment, content delivery network 105 measures the usage of content delivery network 105. Based on the usage data, content delivery network 105 evaluates the utilization of content delivery devices (e.g., edge server controller 115, edge servers 125, load balancer 130, etc.). For example, content delivery network 105 identifies whether the allocation of resources is optimally utilized based on the measured usage. According to an exemplary embodiment, usage manager 127 provides this functionality.

Figure 5A:
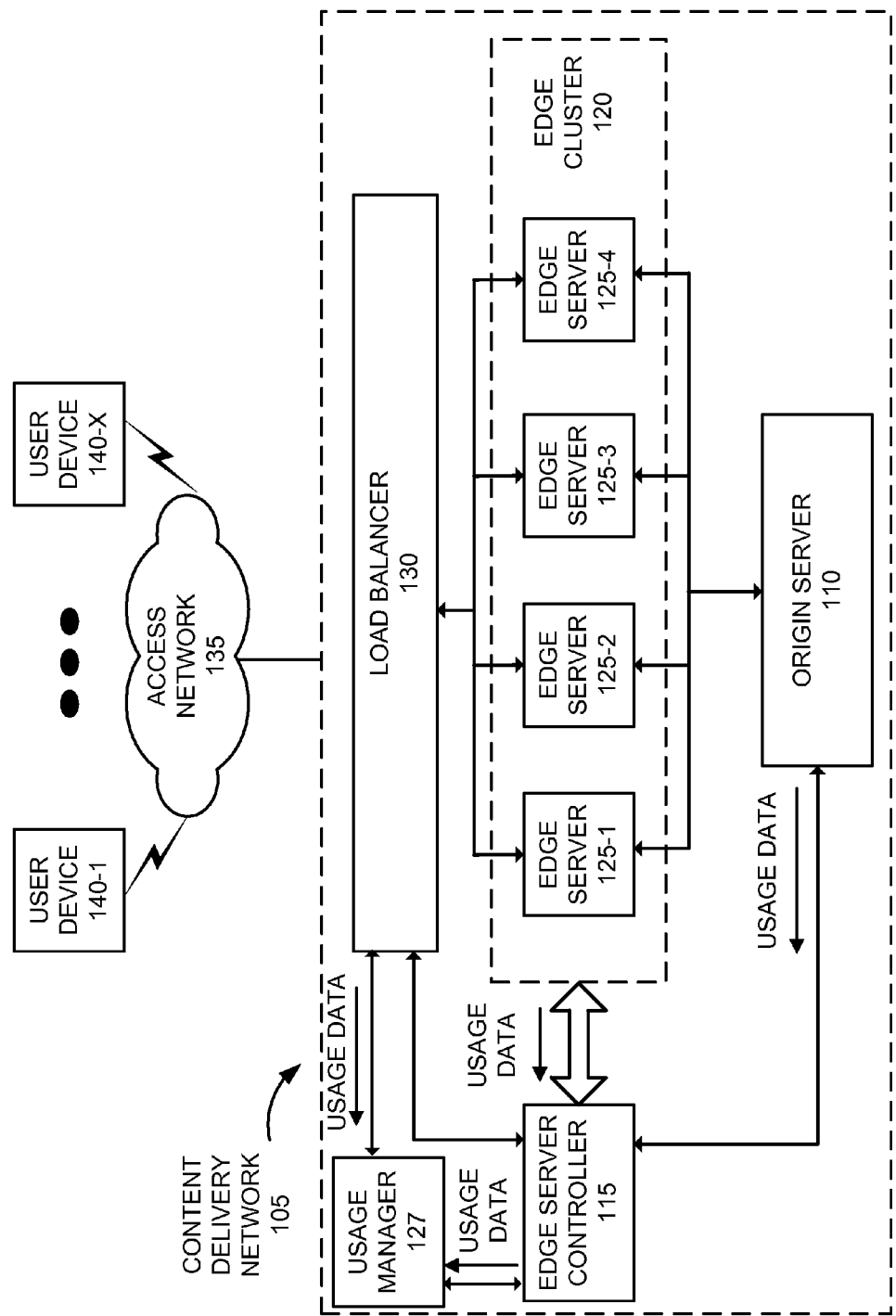
FIGS. 5A-5C are diagrams that illustrate an exemplary process pertaining to a recommending of an infrastructural change to a content delivery network that is based on usage data.
Figure 5B:
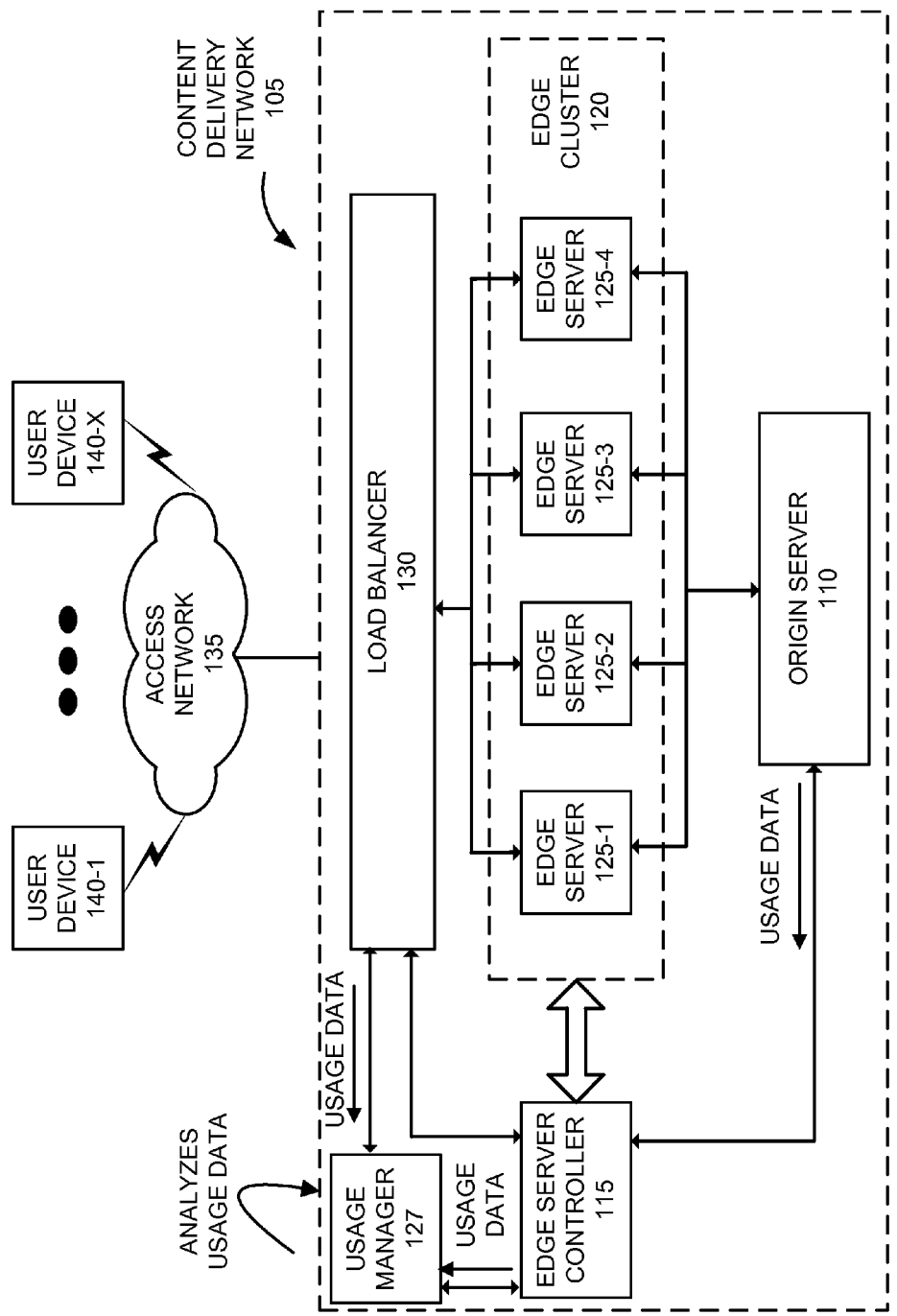
Figure 5C:
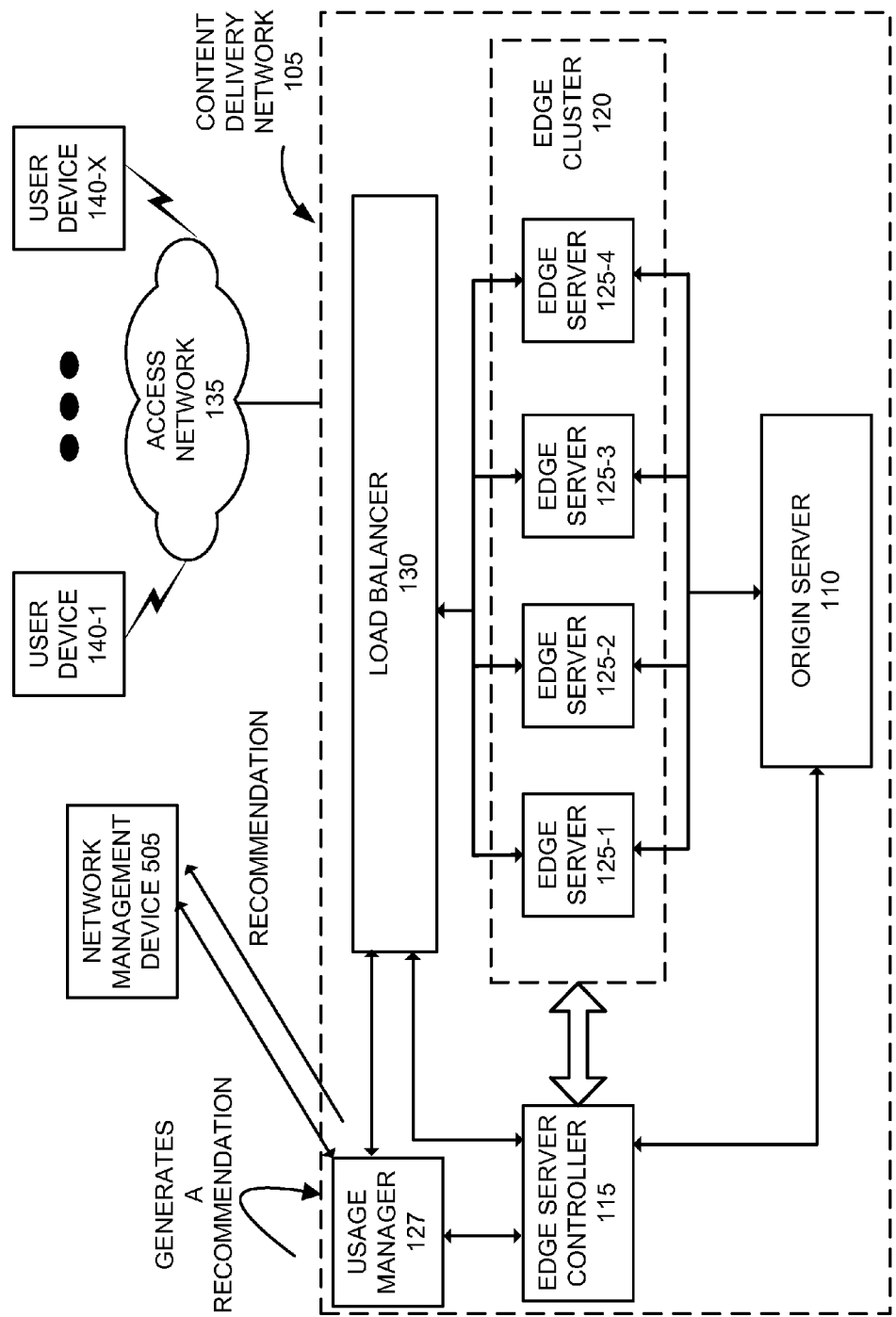

FIGS. 5A-5C are diagrams that illustrate an exemplary process in environment 100 pertaining to a recommending of an infrastructural change to content delivery network 105 that is based on usage data. For example, referring to FIG. 5A, usage manager 127 obtains usage data pertaining to the downloading and/or streaming service. For example, the usage data includes resource utilization data of content delivery network 105. According to an exemplary embodiment, one or multiple of the network devices of content delivery network 105 (e.g., origin server 110, edge server controller 115, edge servers 125, load balancer 130) provide the usage data to usage manager 127. Additionally, or alternatively, usage manager 127 retrieves resource utilization data. For example, usage manager 127 may include network performance or monitoring software that obtains resource utilization data.

Referring to FIG. 5B, usage manager 127 analyzes the usage data and generates a utilization value. The utilization value may relate to a particular network device (e.g., edge server 125-1, etc.), a sub-group of network devices (e.g., edge server device 125-2 and load balancer 130, etc.), and/or content delivery network 105 (e.g., edge servers 125, edge server controller 115, etc.). The utilization value may represent a level of resource utilization. Since resource utilization varies over time, the utilization value may represent a level of resource utilization over a time period. According to an exemplary implementation, the utilization value may be an average of resource utilization over time. According to other exemplary implementations, the utilization value may include multiple values (e.g., high, low, and average).

Usage manager 127 compares the utilization value to a threshold utilization value. Based on a result of the comparison, usage manager 127 generates a recommendation that recommends a change to the current content delivery network infrastructure. According to an exemplary implementation, usage manager 127 may store various threshold utilization values that pertain to particular modifications of the current content delivery network infrastructure. For example, usage manager 127 stores a threshold utilization value pertaining to the removal of a network device (e.g., edge server 125). According to such an exemplary implementation, if the utilization value pertaining to edge server 125 is low and the utilization value satisfies the threshold utilization value, usage manager 127 generates a recommendation that recommends the removal of edge server 125 or recommends a degrading of edge server 125. For example, the edge server 125 may have less processing power, a communication interface that can handle fewer connections, etc. Additionally, usage manager 127 may store a threshold utilization value that pertains to the adding of a network device (e.g., edge server 125) or the upgrading of the network device (e.g., whose potential resources are greater than those of the current network device).

According to an exemplary embodiment, usage manager 127 may consider other types of data. For example, usage manager 127 may consider the number of times multicast/broadcast offloading has been invoked since the invocation of the offloading may be indicative of an over utilization of resources. For example, if the offloading has been invoked a certain number of times, usage manager 127 may recommend the adding of a network device or the upgrading of the network device. Conversely, if the offloading has never been invoked or has been invoked infrequently, then usage manager 127 may recommend the removal or degrading of a network device. Usage manager 127 may store other threshold utilization values pertaining to other modifications of content delivery network 105, such as swapping a network device servicing one geographic area with another network device servicing another geographic area, etc. Additionally, according to an exemplary embodiment, usage manager 127 stores and uses network policies that govern the modification and allocation of resources in content delivery network 105. Usage manager 127 may store service level agreement data and use this data to determine the type of infrastructural change to be recommended.

Depending on the outcome of the analysis described, usage manager 127 may generate a recommendation that recommends a change to the current content delivery network infrastructure. Referring to FIG. 5C, assume that the outcome of the analysis triggers usage manager 127 to generate a recommendation. For example, usage manager 127 may recommend adding, removing, or moving a network device of the content delivery network 105. Usage manager 127 may transmit the recommendation to a network management device 505. An administrator may access network management device 505 to obtain and review the recommendation. Usage manager 127 may transmit other types of data (e.g., reports, statistical data, etc.) on which usage manager 127 relied to generate the recommendation. According to another exemplary embodiment, the administrator may access usage manager 127 to obtain and review the recommendation, as well as other types of data.

Figure 6:
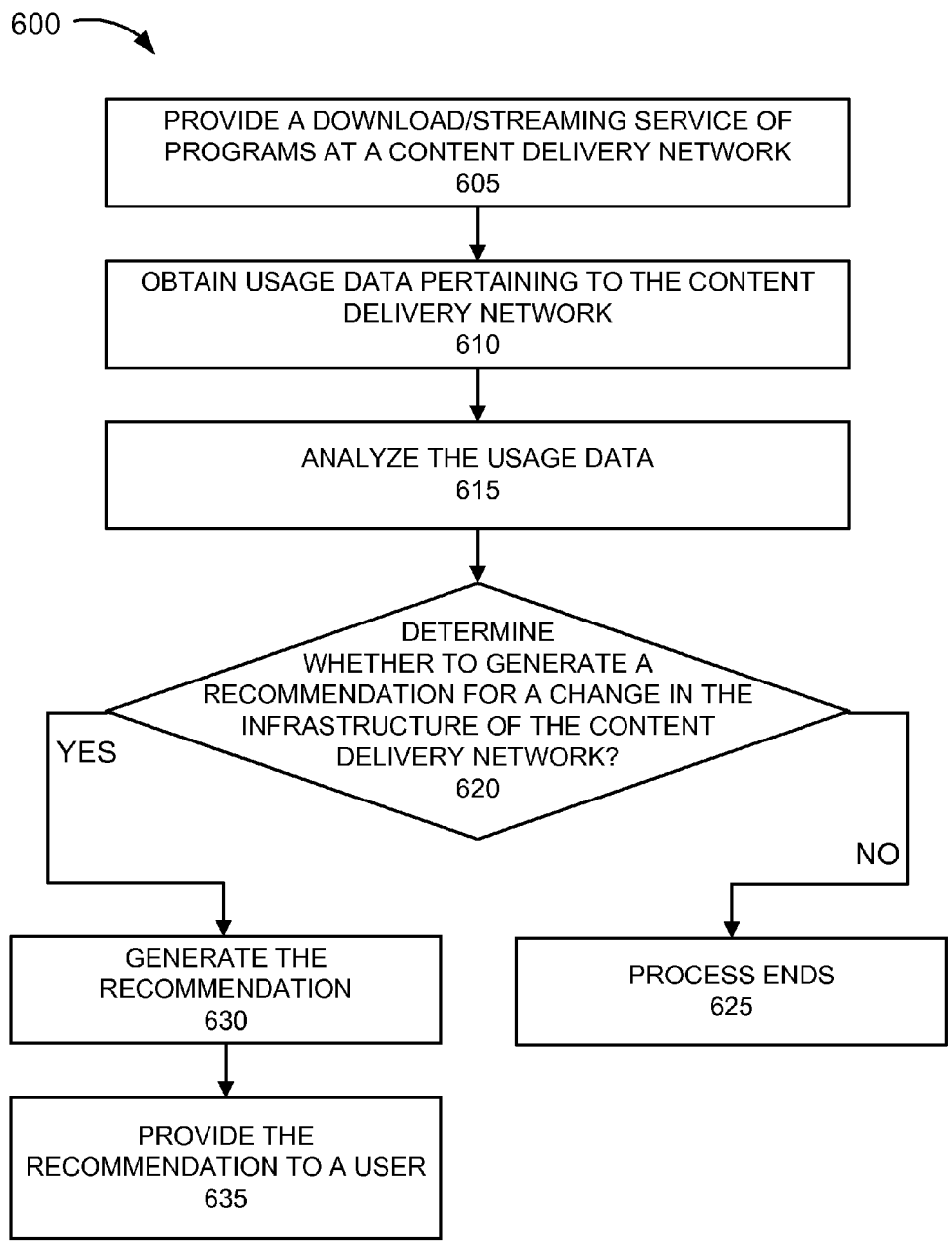
FIG. 6 is a flow diagram that illustrates an exemplary process for recommending an infrastructural change to a content delivery network based on usage data.

FIG. 6 is a flow diagram illustrating an exemplary process 600. Process 600 is directed to a process previously described above with respect to FIGS. 5A-5C and elsewhere in this description, in which usage manger 127 generates a recommendation to modify the infrastructure of content delivery network 105 based on usage data. According to an exemplary embodiment, usage manager 127 performs one or more of the steps described in process 600. For example, processor 305 may execute software 315 to perform the steps described.

Process 600 begins by providing a downloading/streaming service of programs by a content delivery network (block 605). For example, content delivery network 105 offers programs to users via a downloading and/or streaming service. For example, edge servers 125 allow for the downloading and/or streaming of programs to user devices 140 associated with users. Edge servers 125 receive program requests and provide the requested programs to user devices 140 using unicast transmissions. Content delivery network 105 may designate the type of delivery for the programs (i.e., unicast transmission).

In block 610, usage data pertaining to the content delivery network is obtained. For example, usage manager 127 obtains usage data from a network device (e.g., load balancer 130, edge servers 125, edge server controller 115, etc.) of content delivery network 105. Additionally, or alternatively, for example, usage manager 127 may include network performance and monitoring software that obtains usage data. According to yet another exemplary embodiment, another network device may include performance and monitoring software that collects usage data and provides the usage data to usage manager 127. The usage data includes resource utilization data pertaining to content delivery network 105.

In block 615, the usage data is analyzed. For example, usage manager 127 identifies or calculates a utilization value that represent a level of resource utilization over a time period (e.g., instantaneous, over 30 minute period, etc.).

In block 620, it is determined whether to generate a recommendation for a change in the infrastructure of the content delivery network. For example, usage manager 127 compares the utilization value to a threshold utilization value. The threshold utilization value may pertain to a particular modification of content delivery network 105. Based on the result of the comparison, usage manager 127 determines whether to generate the recommendation.

If it is determined not to generate a recommendation (block 620—NO), then the process ends (block 625). For example, if usage manager 127 determines that the threshold utilization value is not satisfied, then process 600 ends.

If it is determined to generate a recommendation (block 620—YES), then the recommendation is generated (block 630). For example, if usage manager 127 determines that the threshold utilization is satisfied, usage manager 127 generates a recommendation. The recommendation indicates a recommended change to content delivery network 105 (e.g., adding a network device, removing a network device, changing the bandwidth of a link between network devices, etc.).

In block 635, the recommendation is provided to a user. For example, usage manager 127 provides or makes available the recommendation to an administrator of content delivery network 105.

Although FIG. 6 illustrates an exemplary process 600, according to other embodiments, process 600 may include additional operations, fewer operations, and/or different operations than those illustrated in FIG. 6, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A network device comprising:
a communication interface;
a memory, wherein the memory stores instructions; and
a processor, wherein the processor executes the instructions to:
obtain usage data that indicates a usage of at least one of a downloading service or a streaming service of programs, wherein the programs are provided to user devices via unicast delivery;
store threshold utilization values, wherein one of the threshold utilization values indicates a minimum usage needed to invoke a multicast offloading and another of the threshold utilization values indicates a minimum usage needed to invoke a broadcast offloading;
analyze the usage data;
generate a current usage value based on the analysis;
compare the current usage value to at least one of the threshold utilization values;
determine whether at least one of the multicast offloading or the broadcast offloading is to be invoked on behalf of a program included in the programs and designated for unicast delivery based on the comparison of the current usage value and the at least one of the threshold utilization values;
generate an offload request that indicates to deliver the program via at least one of a multicast transmission or a broadcast transmission in response to the determination that the at least one of the multicast offloading or the broadcast offloading is to be invoked; and
transmit the offload request to another network device of a content delivery network.

2. The device of claim 1, wherein the processor further executes the instructions to:
calculate future arrivals of program requests for the program; and
determine whether the at least one of the multicast offloading or the broadcast offloading is to be invoked based on the calculation.

3. The device of claim 1, wherein the usage data includes at least two of program request data that pertains to program requests for the program, resource utilization data that pertains to resource utilization of a network device of the content delivery network, or session data that indicates active sessions pertaining to delivery of the program.

4. The device of claim 1, wherein the current usage value includes a current usage value pertaining to the downloading service and a current usage value pertaining to the streaming service.

5. The device of claim 1, wherein the processor further executes the instructions to:
select the at least one of the threshold values based on an arrival rate of program requests for the program.

6. The device of claim 1, wherein the processor further executes the instructions to:

calculate a rate of change of program request arrivals for the program; and determine whether the at least one of the multicast offloading or the broadcast offloading is to be invoked based on the calculation.

7. The device of claim 1, wherein the processor further executes the instructions to:

store maximum utilization parameters pertaining to the content delivery network; and determine whether the at least one of the multicast offloading or the broadcast offloading is to be invoked based on a comparison of the usage data and the maximum utilization parameters.

8. The device of claim 1, wherein the offload request includes a program identifier of the program and a schedule for the at least one of the multicast transmission or the broadcast transmission.

9. A non-transitory storage medium storing instructions executable by a computational device to:

obtain usage data that indicates a usage of at least one of a downloading service or a streaming service of programs, wherein the programs are provided to user devices via unicast delivery;

store threshold utilization values, wherein one of the threshold utilization values indicates a minimum usage needed to invoke a multicast offloading and another of the threshold utilization values indicates a minimum usage needed to invoke a broadcast offloading;

analyze the usage data;

generate a current usage value based on the analysis;

compare the current usage value to at least one of the threshold utilization values;

determine whether at least one of the multicast offloading or the broadcast offloading is to be invoked on behalf of a program included in the programs and designated for unicast delivery based on the comparison of the current usage value and the at least one of the threshold utilization values;

generate an offload request that indicates to deliver the program via at least one of a multicast transmission or a broadcast transmission in response to the determination that the at least one of the multicast offloading or the broadcast offloading is to be invoked; and transmit the offload request to a network device of a content delivery network.

10. The non-transitory storage medium of claim 9, further storing instructions executable by the computational device to:

calculate future arrivals of program requests for the program; and determine whether the at least one of the multicast offloading or the broadcast offloading is to be invoked based on the calculation.

11. The non-transitory storage medium of claim 9, further storing instructions executable by the computational device to:

store maximum utilization parameters pertaining to the content delivery network; and determine whether the at least one of the multicast offloading or the broadcast offloading is to be invoked based on a comparison of the usage data and the maximum utilization parameters.

12. The non-transitory storage medium of claim 9, wherein the offload request includes a program identifier of the program and a schedule for the at least one of the multicast transmission or the broadcast transmission.

13. The non-transitory storage medium of claim 9, further storing instructions executable by the computational device to:

select the at least one of the threshold values based on an arrival rate of program requests for the program.

14. A method comprising:

obtaining, by a network device, usage data that indicates a usage of at least one of a downloading service or a streaming service of programs that are provided to user devices via unicast delivery;

storing, by the network device, threshold utilization values, wherein one of the threshold utilization values indicates a minimum usage needed to invoke a multicast offloading and another of the threshold utilization values indicates a minimum usage needed to invoke a broadcast offloading;

analyzing, by the network device, the usage data based on the obtaining;

generating, by the network device, a current usage value based on the analyzing;

comparing, by the network device, the current usage value to at least one of the threshold utilization values;

determining, by the network device, whether at least one of the multicast offloading or the broadcast offloading is to be invoked on behalf of a program included in the programs and designated for unicast delivery based on the comparing of the current usage value and the at least one of the threshold utilization values;

generating, by the network device, an offload request that indicates to deliver the program via at least one of a multicast transmission or a broadcast transmission in response to determining that the at least one of the multicast offloading or the broadcast offloading is to be invoked; and transmitting, by the network device, the offload request to another network device of a content delivery network.

15. The method of claim 14, further comprising:

calculating future arrivals of program requests for the program; and determining whether the at least one of the multicast offloading or the broadcast offloading is to be invoked based on the calculating.

16. The method of claim 14, wherein the usage data includes program request data that pertains to program requests for the program, resource utilization data that pertains to resource utilization of a network device of the content delivery network, and session data that indicates active sessions pertaining to delivery of the program.

17. The method of claim 14, further comprising:

identifying program requests for the program that have been received by the content delivery network but that no downloading sessions or streaming sessions have begun; and providing the program via the at least one of the multicast transmission or the broadcast transmission.

18. The method of claim 14, further comprising:

selecting, by the network device, the at least one of the threshold values based on an arrival rate of program requests.

19. A method comprising:

storing, by a network device, threshold utilization values, wherein one of the threshold utilization values indicates a minimum usage needed to invoke a multicast offloading and another of the threshold utilization values indicates a minimum usage needed to invoke a broadcast offloading;

obtaining, by the network device, usage data that indicates a usage of at least one of a downloading service or a streaming service of programs that are provided to user devices via unicast delivery;

analyzing, by the network device, the usage data based on the obtaining;

generating, by the network device, a current usage value based on the analyzing;

selecting, by the network device, at least one of the threshold utilization values based on an arrival rate of program requests;

comparing, by the network device, the current usage value to the at least one of the threshold utilization values;

determining, by the network device, whether at least one of the multicast offloading or the broadcast offloading is to be invoked on behalf of a program included in the programs and designated for unicast delivery based on the comparing of the current usage value and the at least one of the threshold utilization values;

generating, by the network device, an offload request that indicates to deliver a program included in the programs via at least one of a multicast transmission or a broadcast transmission in response to determining that the at least one of the multicast offloading or the broadcast offloading is to be invoked; and transmitting, by the network device, the offload request to another network device of a content delivery network.

20. The method of claim 19, wherein the usage data includes program request data that pertains to program requests for the program, resource utilization data that pertains to resource utilization of a network device of the content delivery network, and session data that indicates active sessions pertaining to delivery of the program.

21. The method of claim 19, further comprising:
identifying program requests for the program that have been received by the content delivery network but that no downloading sessions or streaming sessions have begun; and
providing the program via the at least one of the multicast transmission or the broadcast transmission.

22. The method of claim 19, further comprising:
determining an availability of at least one of a broadcast channel or a multicast channel.

23. The method of claim 19, wherein the offload request includes a program identifier of the program and a schedule for the at least one of the multicast transmission or the broadcast transmission.

24. The method of claim 19, wherein the usage data is obtained from at least one of a load balancer, an edge server, or an edge server controller.

25. The method of claim 19, further comprising:
storing maximum utilization parameters pertaining to the content delivery network; and
determining whether the at least one of the multicast offloading or the broadcast offloading is to be invoked based on a comparison of the usage data and the maximum utilization parameters.

* * * * *